United States Patent [19]

Gute

[11] Patent Number: 5,107,890
[45] Date of Patent: Apr. 28, 1992

[54] BALL CHECK VALVE

[75] Inventor: Robert M. Gute, Corunna, Mich.

[73] Assignee: Huron Products Industries, Inc., Mt. Clements, Mich.

[21] Appl. No.: 518,214

[22] Filed: May 3, 1990

[51] Int. Cl.⁵ ............................................. F16K 15/04
[52] U.S. Cl. ................................................... 137/539
[58] Field of Search ............................ 137/539, 539.5

[56] References Cited

U.S. PATENT DOCUMENTS

| | | | |
|---|---|---|---|
| 619,705 | 2/1899 | Knupp | 137/539 X |
| 1,776,937 | 9/1930 | Timbs et al. | 137/539 X |
| 2,069,153 | 1/1937 | Konkle | 137/539 X |
| 2,271,031 | 1/1942 | Parker | 137/539.5 X |
| 2,676,608 | 4/1954 | Svenson | 137/539 X |
| 2,704,549 | 3/1955 | Strnad | 137/539.5 X |
| 2,841,174 | 7/1958 | Frye | 137/539 X |
| 2,865,398 | 12/1958 | Popovich | 137/539 |
| 2,987,075 | 6/1961 | Tebb et al. | 137/539.5 X |
| 3,077,896 | 2/1963 | Weingard | 137/539 X |
| 3,148,707 | 9/1964 | Smyklo et al. | 137/539 X |
| 3,149,697 | 9/1964 | Bendeich et al. | 137/539 X |
| 3,219,057 | 11/1965 | Knowles | 137/539 |
| 3,235,098 | 2/1966 | Emrick | 137/539.5 X |
| 3,249,241 | 5/1966 | Rogers | 137/539.5 X |
| 3,335,750 | 8/1967 | Kepner | 137/539 X |
| 3,421,547 | 1/1969 | Aslan | 137/539 |
| 3,542,155 | 11/1970 | Kern et al. | 137/539 X |
| 3,725,990 | 4/1973 | Petersen et al. | 137/539 X |
| 4,064,889 | 12/1977 | Gayle et al. | 137/539 X |
| 4,234,056 | 11/1980 | Farrell | 137/539 X |
| 4,333,497 | 6/1982 | Busquets | 137/539 X |
| 4,365,648 | 12/1982 | Grothe | 137/539 |
| 4,590,962 | 5/1986 | Tespa | 137/539 X |
| 4,658,608 | 4/1987 | Fox | 137/384.6 X |
| 4,776,430 | 10/1988 | Rule | 137/539 X |

Primary Examiner—John Rivell
Attorney, Agent, or Firm—Dykema Gossett

[57] ABSTRACT

A ball check valve has a body member, a conical spring, a ball and valve seat. The valve seat includes a coined seating surface to reduce leakage.

3 Claims, 1 Drawing Sheet

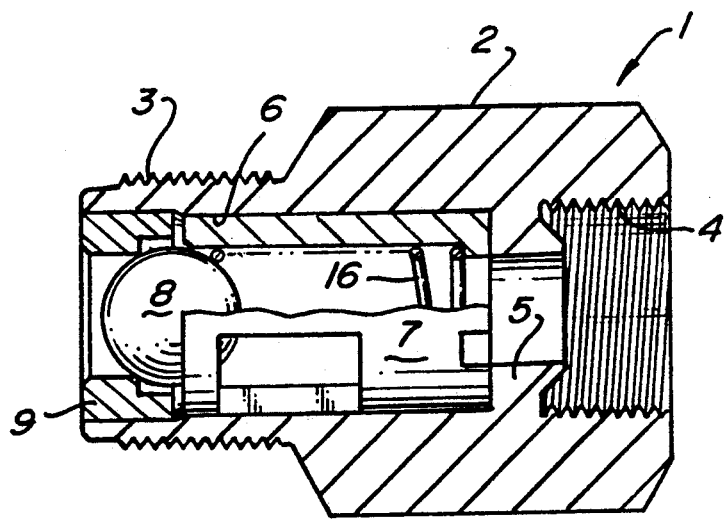
Fig-1
Prior Art
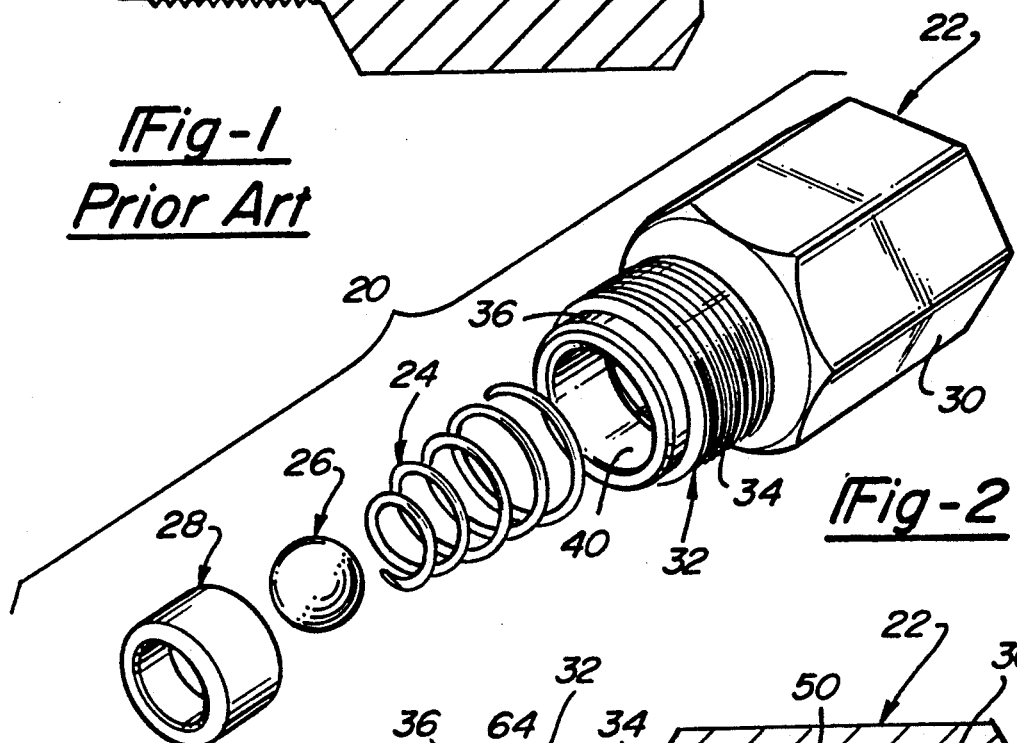
Fig-2
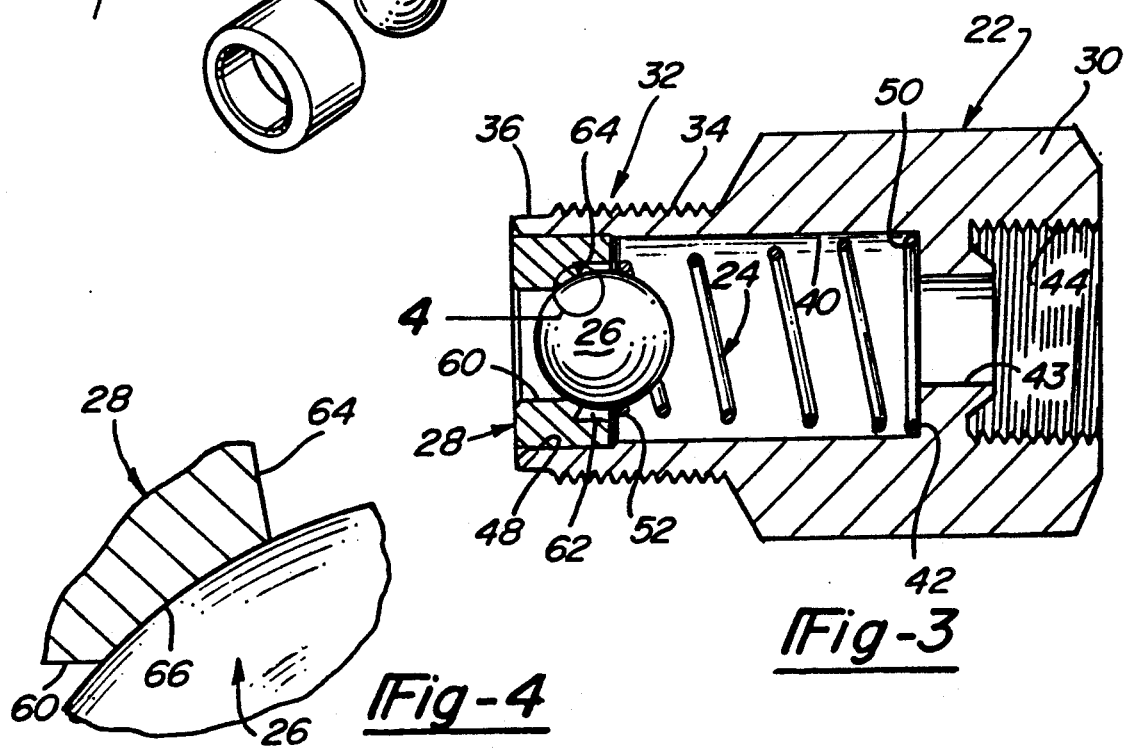
Fig-3
Fig-4

BALL CHECK VALVE

BACKGROUND AND SUMMARY OF THE INVENTION

The present invention relates to valve assemblies and, more particularly, to ball check valves.

Ball check valves are utilized in numerous applications. Ordinarily, these types of valves are housed within a central bore having a ball and spring within the bore. The ball and spring are seated within the housing to provide one-way flow through the valve. Ordinarily, the valves may have different types of assemblies to connect them with a machine, engine, conduit or the like. Ball check valves work efficiently to provide one-way flow in pressurized systems.

One type of ball valve is illustrated in FIG. 1. This type of design has been utilized in the art by applicant. The ball valve generally has a body member 1 with a hexagonal portion 2 and a threaded portion 3. The hexagonal portion enables a wrench or the like to be positioned on the body member to insert the threaded portion 3 into a threaded bore. The body member 1 also includes an interior threaded bore 4 and an integral seat 5. A central bore 6 passes through the body member 1. A right cylindrical spring 6, spring sleeve 7, ball 8 and ball seat 9 are positioned within the central bore 6 to form the valve assembly. While this type of valve assembly performs satisfactorily for its intended purpose, designers are always striving to improve the art.

The present invention provides the art with a check valve assembly having a reduced number of interior parts. The present invention provides the art with a truncated conical spring which biases the ball. A coined seating surface is on the valve seat having a desired configuration to reduce leakage. The new and improved valve assembly is relatively simple to manufacture and may be manufactured at a reduced cost.

From the subsequent detailed description taken in conjunction with the accompanying drawings and subjoined claims, other objects and advantages of the present invention will become apparent to those skilled in the art.

BRIEF DESCRIPTION OF THE DRAWINGS

FIG. 1 is a sectional view of an existing ball check valve.

FIG. 2 is an exploded perspective view of a check valve in accordance with the present invention.

FIG. 3 is an assembled sectional view of the check valve taken along line 3—3 of FIG. 2.

FIG. 4 is an enlarged view of FIG. 3 within the circle 4.

DETAILED DESCRIPTION OF THE PREFERRED EMBODIMENT

Turning to the figures, particularly FIGS. 2 and 3, a ball check valve is illustrated and designated with the reference numeral 20. The check valve 20 includes a body member 22, a spring 24, a ball 26 and a ball seat 28.

The body member 22 is generally cylindrical with a hexagonal portion 30 and a right cylindrical portion 32. The hexagonal portion 30 provides a wrenching surface for the body member 22. The right cylindrical portion 32 has an exterior thread 34 to provide coupling of the body member 22 with a threaded bore. Also, a pilot 36 is at the leading edge of the threads 34.

The body member 22 has a central bore 40 therethrough with a radial flange 42 extending inwardly into the central bore 40. The radial flange 42 also includes a bore 43 therethrough. The central bore 40 includes an interior threaded portion 44 in the hexagonal portion 30 of the body member 22. The interior threaded portion 44 enables the body member 22 to couple with conduits or the like. The central bore 40 includes an enlarged diameter portion 48 at the other end in the cylindrical portion 32 of the body member 22. The enlarged diameter portion 48 receives the valve seat 28 to frictionally retain the valve seat 28 within the central bore 40.

The spring 24 has an overall truncated conical shape and includes a plurality of helical winds. The spring 24 is housed within the central bore 40. The first wind 50 and last wind 52 are in planes which are substantially parallel to one another. The wind 50 seats upon the flange 42 within the central bore 40. The wind 50 generally has a diameter which is substantially equal to the diameter of the central bore 40 to maintain the wind 50 against the flange 42 when in an assembled position like that of FIG. 3. The wind 52 seats the ball 26 to bias the ball 26 in the assembled position, as seen in FIG. 3. The spring 24 is generally formed from stainless steel and has a desired spring constant so that the spring 24 reacts to pressure build-up on the ball 26 to enable the ball 26 to move or compress the spring 24 which, in turn, enables passage of fluid passed the ball 26 and through the body member 22.

The ball 26 may be formed of a carbon steel material. The ball 26 has a desired size and weight to be seated on the ball seat 28 and fitted within the wind 52 of the spring 24. Also wind 52, which surrounds and retains the ball 26, is adjacent to the ball seat enlarged diameter portion 62 when the ball 26 is in a closed position, as seen in FIG. 3.

The ball seat 28 is generally manufactured from a brass material and has an overall cylindrical shape. The ball seat 28 includes a bore 60 therethrough. The bore 60 includes an enlarged portion 62 forming a step 64 on the interior surface of the ball seat 28 at the junction of the bore 60 and enlarged diameter portion 62. The step 64 has a coined surface 66, as seen in FIG. 4. The coined surface 66 has a desired surface configuration, generally arcuate or spheric, providing a complimentary surface for seating the ball 26. The coined surface 66 reduces leakage at the seat.

The valve 20 is generally assembled by providing the body member 22, spring 24, ball 26 and ball seat 28. The body member 22 is positioned to receive the spring 24, ball 26 and ball seat 28. The ball seat 28 is coined to form the arcuate seating surface 66 prior to assembly of the ball seat 28 with the body member 22. The spring 24 and ball 26 are positioned into the bore 40 of the body member 22. The ball seat 28 is then press-fit or friction-fit into the right cylindrical portion 32 of the body member 22 in the enlarged portion 48 of the bore 40. The brass ball seat 28 frictionally secures within the bore 40 and provides a coined seating surface 66 for the ball 26. The ball 26 is biased in the bore 40 by the spring 24 such that in response to fluid pressure, having a force overcoming the spring force, on the non-spring side of the ball 26, the ball 26 moves off of the seating surface 66 toward the spring 24 to enable pressurized fluid to move passed the ball seat 28 into the central bore 40 of the valve 20. Once the spring force overcomes the fluid pressure force, the spring 24 forces the ball 26 against the ball seat 28 closing off the fluid flow path and terminating flow of fluid through the valve. Thus, the check valve provides one-way fluid flow into the valve 20.

While the above detailed description provides a preferred embodiment of the present invention, it will be understood that the present invention is susceptible to modification, variation and alteration without deviating from the scope and fair meaning of the subjoined claims.

What is claimed is:

1. A ball check valve comprising:

a body member with two ends having a bore through said body member, each end having means for coupling the body member with a conduit or the like, and a radial flange unitarily formed with the body extending radially inward into the bore to provide a seating surface;

a ball seat fit into said bore at one of the ends of said body member, said ball seat having an interior surface defining a bore therethrough, said bore having an enlarged diameter portion such that a step is formed with a corner in the interior surface at the junction of the bore and the enlarged diameter portion, said step corner being coined to have an arcuate seating surface said ball being positioned such that a portion of said ball extends into said bore and a portion of said ball is surrounded by said enlarged diameter portion;

a ball positioned in said bore of said body member and removably seated on said coined arcuate seating surface of said ball seat such that said surface is complimentary to said ball to seat said ball at the junction of the ball seat bore and the enlarged diameter portion to reduce leakage; and a truncated conical shaped helical spring with a plurality of winds positioned in said bore of said body member, said spring having a wind at one end with a diameter enabling said wind to surround said ball, said ball fitted within and retained by said wind such that said spring biases said ball against said seating surface of said ball seat said wind surrounding said ball and being adjacent said ball seat enlarged diameter portion in the closed position and said spring seated on said radial flange in said body member.

2. The ball check valve according to claim 1 wherein said spring is formed from stainless steel.

3. A method of manufacturing a ball check valve comprising:

providing a body member having two ends with a bore therethrough, each end having means for coupling the body member, and a radial flange unitarily formed with the body extending radially inward into the bore, a ball seat having an interior surface defining a central bore with an enlarged diameter portion, a ball, and a truncated conical spring with a plurality of winds;

coining said ball seat at the interior surface at the junction of the central bore and the enlarged diameter portion to form a desired arcuate configuration seating surface on said ball seat at the junction of the central bore and the enlarged diameter portion complimentary for seating said ball to reduce leakage;

positioning said conical spring in said body member seating on said flange;

positioning said ball within one of said winds of spring having a diameter such that said wind surrounds and retains said ball in said body member; and fitting said ball seat in said bore at one end of said body such that said ball seats against said seating surface.

* * * * *